United States Patent [19]
Maier

[11] Patent Number: 5,215,384
[45] Date of Patent: Jun. 1, 1993

US005215384A

[54] SELF-CENTERING SQUEEZE FILM DAMPER BEARING

[75] Inventor: Martin D. Maier, Olean, N.Y.

[73] Assignee: Dresser-Rand Company, Olean, N.Y.

[21] Appl. No.: 869,514

[22] Filed: Apr. 16, 1992

[51] Int. Cl.[5] ............................................. F16C 17/03
[52] U.S. Cl. ..................................... 384/99; 384/117; 384/119; 384/312
[58] Field of Search ................. 384/99, 117, 119, 312, 384/309, 311

[56] References Cited

U.S. PATENT DOCUMENTS

| | | |
|---|---|---|
| 4,023,868 | 5/1977 | Miki . |
| 4,092,048 | 5/1978 | Bennett, Jr. et al. . |
| 4,392,751 | 7/1983 | Ida et al. ................................. 384/99 |
| 4,458,843 | 7/1984 | Bolner ............................ 239/265.35 |
| 4,726,694 | 2/1988 | McFarlin et al. ...................... 384/119 |
| 4,782,919 | 11/1988 | Chalaire et al. ......................... 384/99 |
| 4,952,076 | 8/1990 | Wiley et al. ............................ 384/99 |
| 5,044,781 | 9/1991 | Werner ................................. 384/99 |
| 5,149,206 | 9/1992 | Bobo ................................... 384/99 |

*Primary Examiner*—Lenard A. Footland
*Attorney, Agent, or Firm*—Richards, Medlock & Andrews

[57] ABSTRACT

A squeeze film damper bearing (100) has the means of automatically centering itself from the force associated with lateral shaft vibration. It utilizes a floating ring (108) positioned between a housing (102) and a cage (106) with O-rings (115, 116, 130, 131) positioned between adjacent parts to maintain proper clearances. Oil is introduced into the clearances to serve as a damping medium. Squeeze film damping action occurs in the clearances when the force associated with lateral shaft vibration is transmitted from the shaft (120) through the radial bearing (114) to the damper oil films. The mating cylindrical surfaces between the flowing ring (108) and housing (102) have a common longitudinal axis 100a which is inclined with respect to the longitudinal shaft centerline 120a by an angle (122) which provides the means for the floating ring (108) to reposition itself so that it can assume a centered position with respect to the housing (102) and the cage (106) when subjected to lateral forces. In this way, the optimum amount of damping can be imparted to the rotor system as the support O-rings (118, 119) deform with time.

25 Claims, 3 Drawing Sheets

SELF-CENTERING SQUEEZE FILM DAMPER BEARING

TECHNICAL FIELD OF THE INVENTION

The present invention relates to a self-centering, squeeze film, damper bearing.

BACKGROUND OF THE INVENTION

Bearings are designed to support and position rotating shafts, to transfer loads between the rotating and stationary members, and to permit free rotation with a minimum of friction. A bearing is typically composed of rolling elements interposed between an outer and inner ring. Separators, sometimes called "retainers," are used to space the rolling elements from each other. These rolling elements are typically either ball bearings or roller bearings. Still, bearings may include no rolling members at all. The bearing may simply provide a low friction surface adjacent the shaft to control vibration.

The method of supplying the lubricant and the quantity of lubricant which is fed to the bearing will often be the greatest factor in establishing performance characteristics of the bearing. For example, if no lubricant is present, the journal and bearing will rub against each other in the dry state. If lubricant is present in even small quantities, the surfaces become contaminated by this material and the coefficient of friction between the surfaces will be reduced. If an abundance of lubricant is fed to the bearing so that there is an excess flowing out of the bearing, it is possible to provide a self-generating pressure film in the clearance space between the shaft and bearing. Such pressure film can be sufficient to sustain a considerable load and to keep the rubbing surfaces of the bearing separated.

A number of bearing designs also attempt to dampen vibrations from the rotating shaft. For example, U.S. Pat. No. 4,392,751 to Ida et al. discloses a damped bearing device which utilizes a fluid film between inclined surfaces. A bearing backup member can be moved in the axial direction along the inner surface of the housing by the turning of adjusting screws. However, no provision exists for the self-centering of the bearing block member since it is rigidly connected to the screws.

U.S. Pat. No. 4,023,868 to Miki features a damped bearing device in which the outer ring is axially slidable with respect to the case and rolling element so as to automatically adjust the bearing device to its initial pre-load condition. The O-ring can be positioned to allow for damping fluid to be between the upper surface of the outer ring and the lower surface of the case.

However, neither of these patents discloses a floating ring having an outer surface which is inclined to the same degree as the inner surface of the housing and which is allowed to float with respect to the cage and housing by way of specific positioning of flexible supports and fluid channels.

Therefore, a need exists for a damper which automatically compensates for changes in bearing position. Furthermore, this damper must be capable of maintaining adequate clearances between bearing elements, allowing those clearances to be filled with an oil film.

SUMMARY OF THE INVENTION

The present invention comprises a damper bearing which has means for automatically centering itself from the force associated with lateral shaft vibration. The bearing is typically utilized with a horizontal shaft. It features a separate floating ring positioned between a housing and a flexibly supported cage, with squeeze film damping occurring in the interposing clearances. The mating cylindrical surfaces of the floating ring and the housing are coaxial with each other and inclined with respect to the shaft centerline by a prescribed angle. When lateral shaft vibration occurs, the floating ring "walks" along the inclined bore of the housing until it assumes a centered position with respect to the bearing cage and housing. This self-centering design insures that the damper bearing will be free to oscillate without hindrance and will impart an optimum amount of damping to the rotor system supported by the bearing.

A radial bearing, such as ball bearings, roller bearings, tilt pads, a fixed profile hydrodynamic bearing, etc., is loosely attached to the cage to present a low friction surface to the rotating shaft. Oil in the clearances between bearing elements also lubricates the interface between the radial bearing and the rotating shaft. Specifically, oil is supplied to a cavity between the housing and the floating ring. This cavity is in fluid communication with the clearance between the floating ring and the housing, the clearance between the floating ring and any housing end plates, and the clearance between the floating ring and the cage. A longitudinal pressure equalization passageway can penetrate the floating ring to equalize pressures on both axial ends of the floating ring. Oil can be supplied to the radial bearing by an oil supply passage through the floating ring and the cage connecting the cavity between the housing and floating ring to a clearance between the cage and the radial bearing. An alignment dowel between the cage and floating ring maintains the integrity of this oil supply passageway. An anti-rotation dowel between the cage, floating ring, and housing prevents the cage and floating ring from rotating.

BRIEF DESCRIPTION OF THE DRAWINGS

For a more complete understanding of the present invention, and for further details and advantages thereof, reference is now made to the following detailed description taken in conjunction with the accompanying drawings, in which.

DETAILED DESCRIPTION

Figure 1:
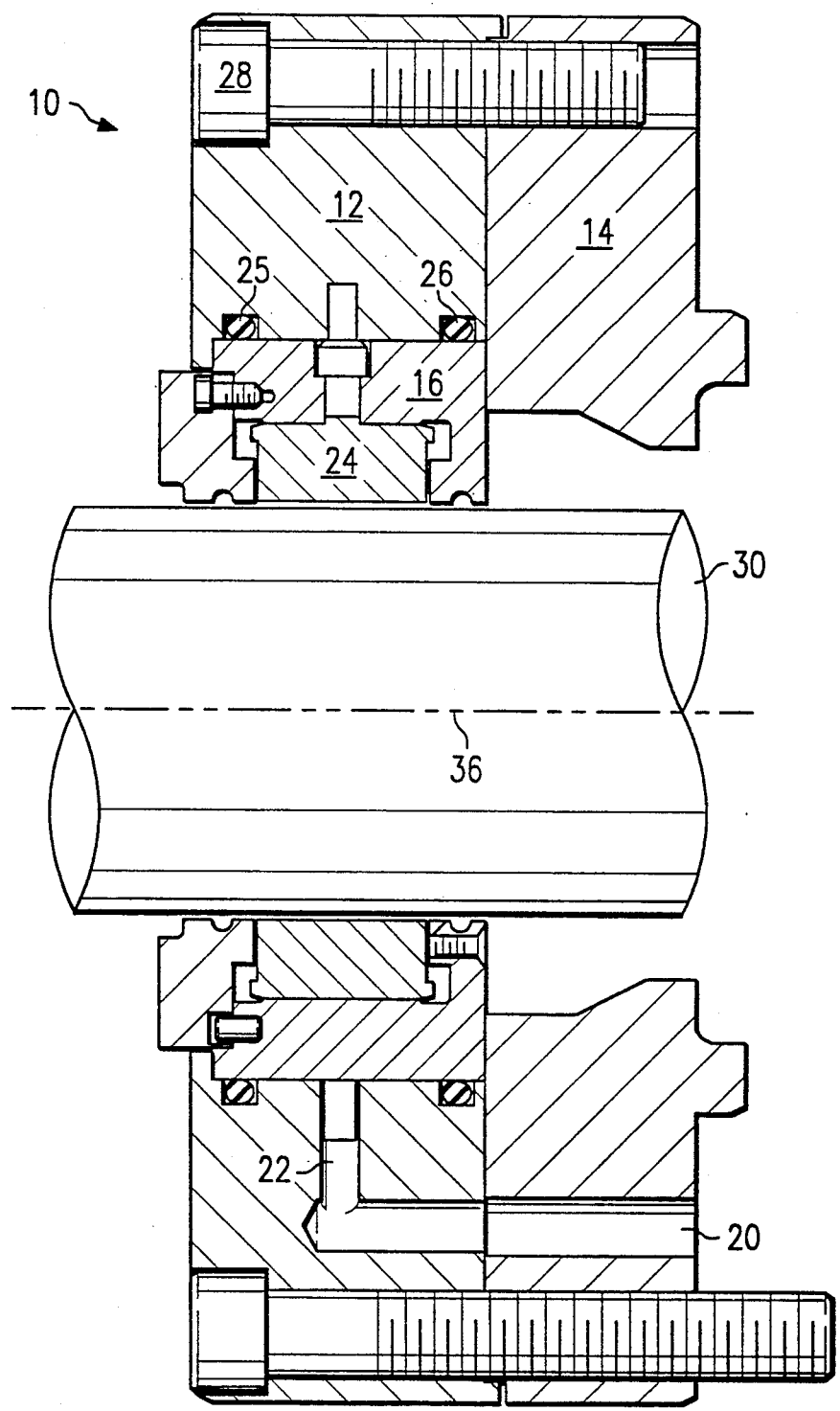
FIG. 1 is a sectional view across an existing O-ring damper bearing.

The present invention is a self-centering, squeeze film, damper bearing that overcomes many of the disadvantages found in the prior art. Referring to FIG. 1, a damper bearing 10 reflecting the prior art is illustrated.

FIG. 1 is an assembly drawing of an existing O-ring damper bearing. A bearing cage 16 which contains at least one tilt pad shoe 24 is supported within a housing 12 by two circumferential O-rings 25, 26. A housing end plate 14 is connected to housing 12 by attachment means 28. A certain amount of clearance exists between the cage 16 and housing 12, and this clearance contains a lubricating oil. This oil is supplied through a feed hole 20 which leads to an annular slot 22. Squeeze film damping action takes place when the oil is squeezed out of this clearance region as the cage assembly vibrates in the lateral direction. The damper cage 16 imparts the optimum amount of damping to the rotor system 36 when it oscillates about the center position 36.

Figure 2:
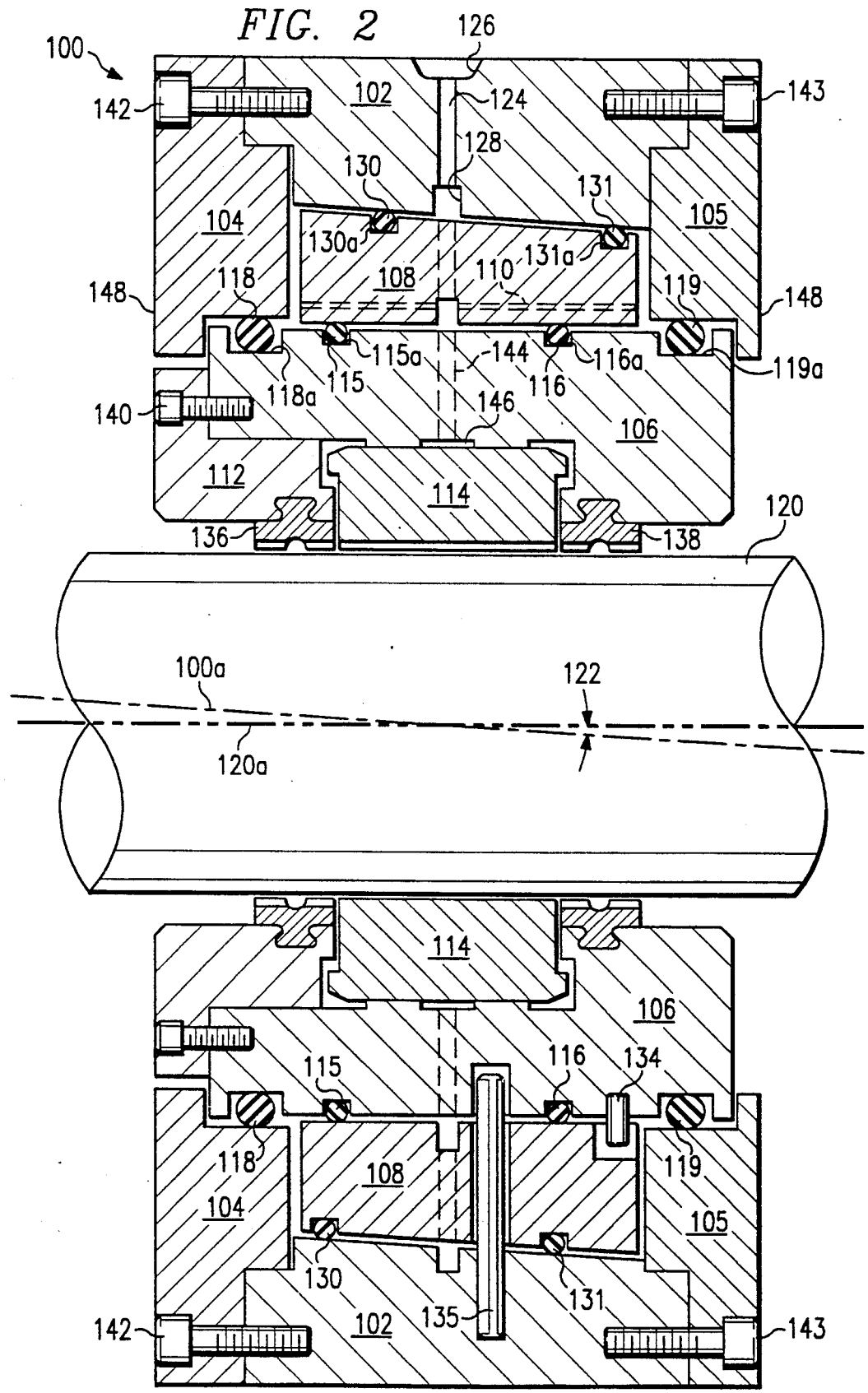
FIG. 2 is a sectional view of a first embodiment of a self-centering, squeeze film, damper bearing in accordance with the present invention.

FIG. 2 illustrates a first embodiment of the present invention. Damper bearing 100 consists of elements including a fixed circumferential housing 102, an annular cage 106, an annular floating ring 108, and an annular radial bearing 114 surrounding shaft 120. The radial bearing 114, typically tilt pads, presents a low-friction surface to shaft 120. The tilt pads 114 are loosely attached to cage 106, thus allowing some pad movement relative to the cage 106 in response to shaft vibration. Two annular seals 136, 138 are also attached to cage 106, each one being located adjacent to a respective axial end of tilt pads 114. Typically, five tilt pads are utilized to form a complete bearing ring, each tilt pad covering an arc of seventy-two degrees.

The housing 102 can be a unitary element, but is preferably in three or more pieces for ease of assembly. Housing end plate 104 is rigidly attached to one end of the housing 102 by attachment means 142, while housing end plate 105 is rigidly attached to the opposite end of housing 102 by attachment means 143. Cage end plate 112 is rigidly attached to cage 106 by attachment means 140. The outer cylindrical surface of cage 106 and the inner cylindrical surfaces of housing 102, end plate 104 and floating ring 108, which mate therewith, have longitudinal axes which at least generally coincide with the longitudinal axis 120a of shaft 120. The cage 106 is surrounded by a number of O-rings. Large support O-rings 118, 119 are positioned between the outer cylindrical surface of cage 106 and the mating inner cylindrical surfaces of housing 102 and housing end plate 104 to provide a sealing engagement between cage 106 and housing 102 at two axially spaced apart locations along the length of shaft 120. O-rings 118, 119 provide flexible support to the cage 106, especially in horizontal shaft applications. In time, these O-rings can lose some of their resilience. The weight of shaft 120 will cause the portion of cage 106 under shaft 120 to approach adjacent housing 102 and housing end plate 104, thus compressing the lower portions of the O-rings 118, 119. The annular O-ring grooves 118a, 119a are machined concentric to the shaft centerline 120a. The clearance between the cage 106 and housing 102 in the vicinity of the supporting O-rings 118, 119 is sufficiently large to ensure that contact will not be made between the metal parts.

The floating ring 108 is positioned between the cage 106 and housing 102 and housing end plate 104 by an outer set of O-rings 130, 131 and an inner set of O-rings 115, 116. These O-rings 115, 116, 130, 131 maintain a clearance between adjacent metal components. The mating cylindrical surfaces between the floating ring 108 and housing 102 having a common longitudinal axis 100a which is inclined with respect to the shaft centerline 120a by an angle 122. O-rings 115, 116 maintain clearance between the floating ring 108 and the cage 106, and are installed with a certain amount of radial crush to ensure proper sealing. They can be smaller than the support O-rings 118, 119 as they do not support much load. The annular grooves 115a, 116a into which O-rings 115, 116 are fitted can be formed in either cage 106 or floating ring 108 concentric to the rotary shaft centerline 120a in a plane perpendicular to shaft centerline 120a. O-rings 130, 131 maintain clearance between the floating ring 108 and the housing 102, and are installed with a certain amount of radial crush to ensure proper sealing. They can be similar in size to O-rings 115, 116. The annular grooves 130a, 131a into which O-rings 130, 131 are fitted can be formed in either floating ring 108 or housing 102. The grooves 130a, 131a are shown as being machined in a plane perpendicular to the inclined common longitudinal axis 100a, which permits the production of each of annular grooves 130a, 131a in the form of a circle rather than an ellipse.

Oil is supplied to the clearance between the various element through inlet 126. The oil flows down passageway 124 and into annular cavity 128. The oil then fills the clearances. Squeeze film damping action takes place when oil is squeezed out of these clearances by lateral movement of the cage 106 which is brought about by shaft vibration. A longitudinal passageway 110 extends from an opening in one end of floating ring 108 to an opening in the opposite end of the floating ring 108 to equalize the static pressure across the O-rings 115, 116.

A passageway 144 extends generally radially to penetrate both the floating ring 108 and the cage 106 to connect annular cavity 128 and annular cavity 146 which contains the tilt pads 114. An alignment dowel 134, positioned in cage 106, extends into a cavity in floating ring 108 to assist in the proper alignment of these parts during assembly. An anti-rotation dowel 135 is positioned in radially extending openings in housing 102, floating ring 108, and cage 106 to prevent rotation of cage 106 and floating ring 108.

Figure 3:
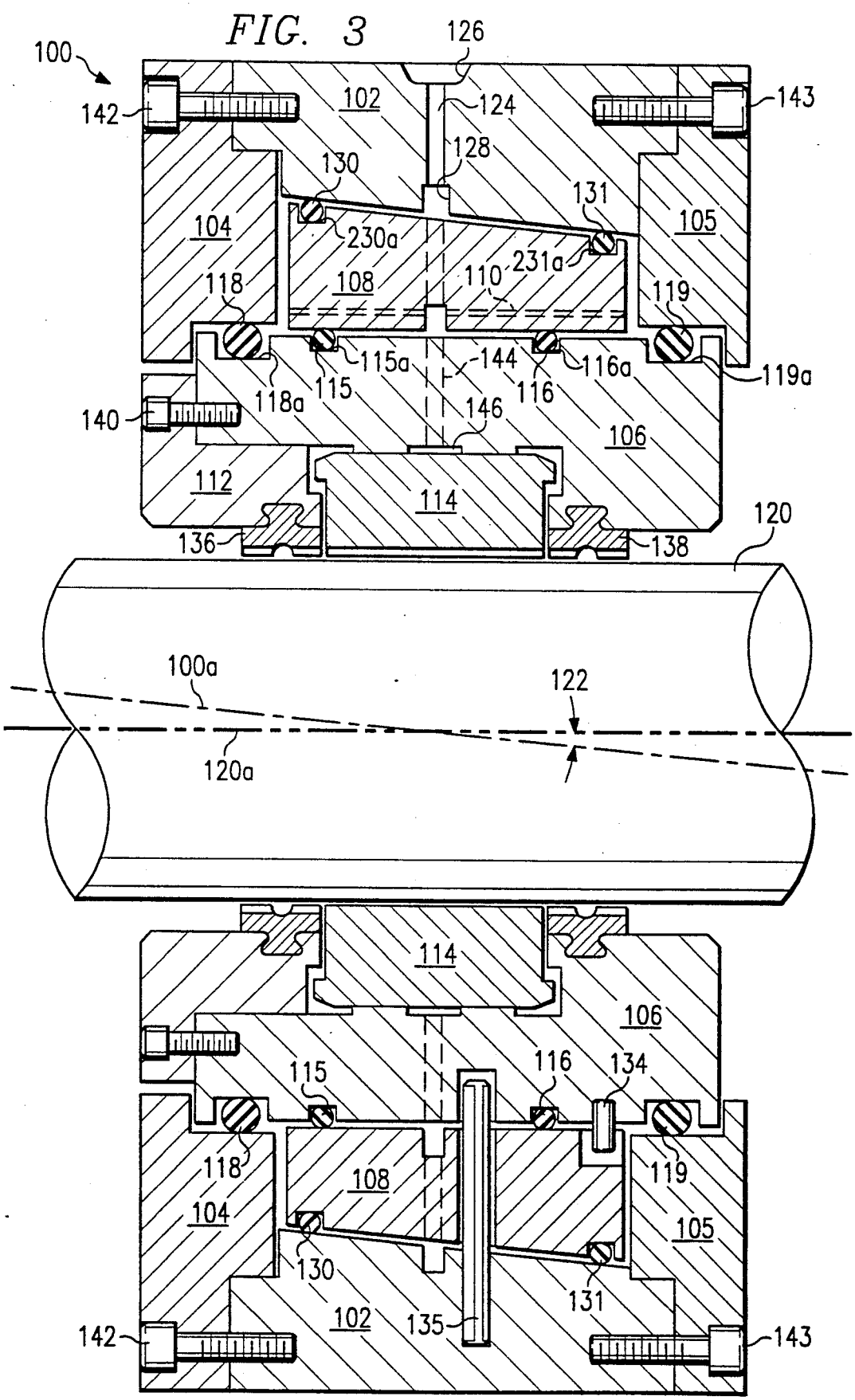
FIG. 3 is a sectional view of a second embodiment of a self-centering, squeeze film, damper bearing in accordance with the present invention.

FIG. 3 illustrates a second embodiment of the present invention, wherein the same reference characters are utilized for parts which are in common with FIG. 2. In this embodiment, the annular grooves 130a, 131a have been replaced by annular grooves 230a, 231a, each of which is positioned in a respective plane which is perpendicular to shaft centerline 120a. The annular grooves 230a, 231a into which O-rings 130, 131 are fitted can be formed in either floating ring 108 or housing 102. The O-ring grooves 230a, 231a can be machined as cylindrical grooves or as elliptical grooves. With cylindrical grooves 230a, 231a, the O-rings 130, 131 would protrude a varying amount around the circumference of the floating ring 108 in the unassembled condition, and the O-ring crush would vary circumferentially in the assembled condition, but this would be acceptable for small values of inclination angle 122. The elliptical form is preferred for grooves 230a, 231a from a technical standpoint, but would generally be more expensive to machine than the circular form. The elliptical form of the grooves can be machined with a five axis milling machine.

As the floating ring 108 is assembled eccentrically with respect to the housing 102 in both illustrated embodiments of the invention, the component of the dynamic force associated with lateral shaft vibration will tend to push the floating ring 108 along the inclined inner surface of the housing 102 until the floating ring 108 assumes a centered position with respect to the cage 106 and the housing 102. The angle of inclination 122 determines the fraction of the dynamic force that will serve as the centering force. An extremely large angle 122 in either embodiment could result in a centering force which would be much larger than the frictional restraining force and ring inertia. This could cause the ring 108 to continually oscillate up and down the ramp. As each of the O-rings 130, 131 in FIG. 2 is positioned in a plane which is inclined at a corresponding angle to the longitudinal axis 120a, an excessively large angle 122 in the embodiment of FIG. 2 could result in a moment which would "cock" the floating ring 108 into an interference with cage 106 and/or housing 102. An extremely small angle 122 in either embodiment could result in a centering force which would be much smaller than the frictional restraining force and ring inertia, thus permitting the ring to lock up in an eccentric position. The ramp angle 122 in either embodiment should be designed so that the ring "walks" along the inclined surface until it finds the center position. This "walking" range of angle 122 is typically in the range of about two degrees to about fifteen degrees and preferably is in the range of about two degrees to about ten degrees. Traditional damper bearings require bench testing to determine whether the cage is either centered or near centered within the housing. This will not be necessary with the present invention since the floating ring will automatically center itself when the machine is first brought up to speed.

Although preferred embodiments of the invention have been described in the foregoing detailed description and illustrated in the accompany drawings, it will be understood that the invention is not limited to the embodiments disclosed, but is capable of numerous rearrangements, modifications, and substitutions of parts and elements without departing from the spirit of the invention. For example, housing 102 and housing end plates 104 and 105 can be replaced by a single component housing, a two component housing or by a housing formed of more than three components. The use of two end plates is particularly advantageous for simplicity in fabrication of the elements for larger values of the angle 122. Support O-rings 118 and 119 can be replaced by other flexible support systems, e.g. mechanical springs. A single flexible support for supporting cage 106 within housing 102 can be employed, but it is presently preferred to utilize at least two flexible supports, with at least one flexible support being positioned adjacent the high pressure end of the housing and at least one flexible support being positioned adjacent the low pressure end of the housing with the floating ring 108 positioned between the two flexible supports. The invention is applicable to damper bearings utilizing radial bearings other than tilt pads, e.g. ball bearings, roller bearings, fixed profile hydrodynamic bearings, etc. While the floating ring 108 has been illustrated as having a circular cross section in a plane perpendicular to its longitudinal axis, floating rings having other cross section configurations can be employed. For example, the cross section perpendicular to the longitudinal axis could be oval or substantially rectangular with rounded corners, thereby eliminating the need for the anti-rotation pin 134. Accordingly, the present invention is intended to encompass such rearrangements, modifications, and substitutions of parts and elements as fall within the spirit and scope of the invention.

I claim:

1. A self-centering squeeze film damper bearing which supports a shaft, said damper bearing comprising:
 a circumferential housing positioned around said shaft;
 an annular cage positioned between said housing and said shaft;
 flexible support means to flexibly support said cage within said housing;
 a radial bearing positioned between said cage and said shaft to provide a bearing surface for said shaft; and
 a self-centering floating ring positioned between said housing and said cage.

2. A self-centering squeeze film damper bearing in accordance with claim 1 wherein the longitudinal axis of said floating ring is inclined at an acute angle with respect to the centerline of said shaft.

3. A self-centering squeeze film damper bearing in accordance with claim 1 wherein said housing is penetrated by a passageway connecting a source of oil outside said housing to a cavity between said housing and said floating ring.

4. A self-centering squeeze film damper bearing in accordance with claim 3 wherein said cavity is in liquid floating ring, clearances between said housing and said cage, and clearances between said floating ring and said cage.

5. A self-centering squeeze film damper bearing in accordance with claim 1 wherein said flexible support means comprises flexible supports positioned between said cage and said housing at two axially spaced apart locations along the length of said shaft to flexibly support said cage within said housing; and wherein said self-centering floating ring is positioned between said housing and said cage at a location between said two axially spaced apart locations.

6. A self-centering squeeze film damper bearing in accordance with claim 5 wherein said flexible supports comprise at least one O-ring positioned between said cage and said housing at each of said two axially spaced apart locations.

7. A self-centering squeeze film damper bearing in accordance with claim 1 wherein said floating ring is separated from said housing by at least two O-rings, and wherein said floating ring is separated from said cage by at least two O-rings.

8. A self-centering squeeze film damper bearing in accordance with claim 1 further comprising first and second annular seals positioned between said cage and said shaft, with said radial bearing being located between said first and second annular seals.

9. A self-centering squeeze film damper bearing in accordance with claim 1 further comprising an anti-rotation dowel extending at least generally radially through said floating ring and engaging said cage and said housing.

10. A self-centering squeeze film damper bearing in accordance with claim 1 wherein inwardly extending flanges on said housing limit movement of said cage parallel to the longitudinal axis of said shaft.

11. A self-centering squeeze film damper bearing in accordance with claim 1 wherein said floating ring has a passageway extending at least generally longitudinally therethrough from a first opening adjacent one end of said floating ring to a second opening adjacent the opposite end of said floating ring to equalize the fluid pressures on the two ends of said floating ring.

12. A self-centering squeeze film damper bearing in accordance with claim 1 wherein said floating ring has an outer cylindrical surface with the longitudinal axis of said outer cylindrical surface of said floating ring being inclined at an acute angle with respect to the centerline of said shaft.

13. A self-centering squeeze film damper bearing in accordance with claim 12 wherein said housing has an inner cylindrical surface which complements and mates with said outer cylindrical surface of said floating ring, with the longitudinal axis of said inner cylindrical surface of said housing being the longitudinal axis of said outer cylindrical surface of said floating ring.

14. A self-centering squeeze film damper bearing in accordance with claim 13 wherein said acute angle is in the range of about two degrees to about fifteen degrees.

15. A self-centering squeeze film damper bearing in accordance with claim 14 wherein said housing is penetrated by a passageway connecting a source of oil outside said housing to a cavity between said housing and said floating ring.

16. A self-centering squeeze film damper bearing in accordance with claim 15 wherein said cavity is in liquid communication with clearances between said housing and said floating ring, clearances between said housing and said cage, and clearances between said floating ring and said cage.

17. A self-centering squeeze film damper bearing in accordance with claim 16 wherein said flexible supports comprise at least one O-ring positioned between said cage and said housing at each of said two axially spaced apart locations.

18. A self-centering squeeze film damper bearing in accordance with claim 17 wherein said floating ring is separated from said housing by at least two O-rings, and wherein said floating ring is separated from said cage by at least two O-rings.

19. A self-centering squeeze film damper bearing in accordance with claim 18 wherein the O-rings separating said floating ring from said housing are positioned in annular grooves which are coaxial with said outer cylindrical surface of said floating ring, and wherein the O-rings separating said floating ring from said cage are positioned in annular grooves which are coaxial with said shaft.

20. A self-centering squeeze film damper bearing in accordance with claim 18 further comprising first and second annular seals positioned between said cage and said shaft, with said radial bearing being located between said first and second annular seals.

21. A self-centering squeeze film damper bearing in accordance with claim 18 wherein said floating ring has a passageway extending at least generally longitudinally therethrough from a first opening adjacent one end of said floating ring to a second opening adjacent the opposite end of said floating ring to equalize the fluid pressures on the two ends of said floating ring.

22. A self-centering squeeze film damper bearing in accordance with claim 18 wherein inwardly extending flanges on said housing limit movement of said cage parallel to the longitudinal axis of said shaft.

23. A self-centering squeeze film damper bearing in accordance with claim 18 further comprising an anti-rotation dowel extending at least generally radially through said floating ring and engaging said cage and said housing.

24. A self-centering squeeze film damper bearing in accordance with claim 18 wherein the O-rings separating said floating ring from said housing are positioned in annular grooves which are coaxial with said shaft, and wherein the O-rings separating said floating ring from said cage are positioned in annular grooves which are coaxial with said shaft.

25. A self-centering squeeze film damper bearing in accordance with claim 18 wherein said acute angle is in the range of about two degrees to about ten degrees.

* * * * *

UNITED STATES PATENT AND TRADEMARK OFFICE
CERTIFICATE OF CORRECTION

PATENT NO. : 5,215,384

DATED : June 1, 1993

INVENTOR(S) : Martin D. Maier

It is certified that error appears in the above-identified patent and that said Letters Patent is hereby corrected as shown below:

Column 6, line 13, after "liquid" insert --communication with clearances between said housing and said--.

Column 7, line 19, after "16" insert --wherein said flexible support means comprises flexible supports positioned between said cage and said housing at two axially spaced apart locations along the length of said shaft to flexibly support said cage within said housing; wherein said self-centering floating ring is positioned between said housing and said cage at a location between said two axially spaced apart locations; and--.

Signed and Sealed this

Fifth Day of April, 1994

Attest:

BRUCE LEHMAN

Attesting Officer

Commissioner of Patents and Trademarks